Nov. 29, 1960         G. SLAYTER         2,961,758
METHOD OF MAKING A METAL ELEMENT
Original Filed Jan. 16, 1952
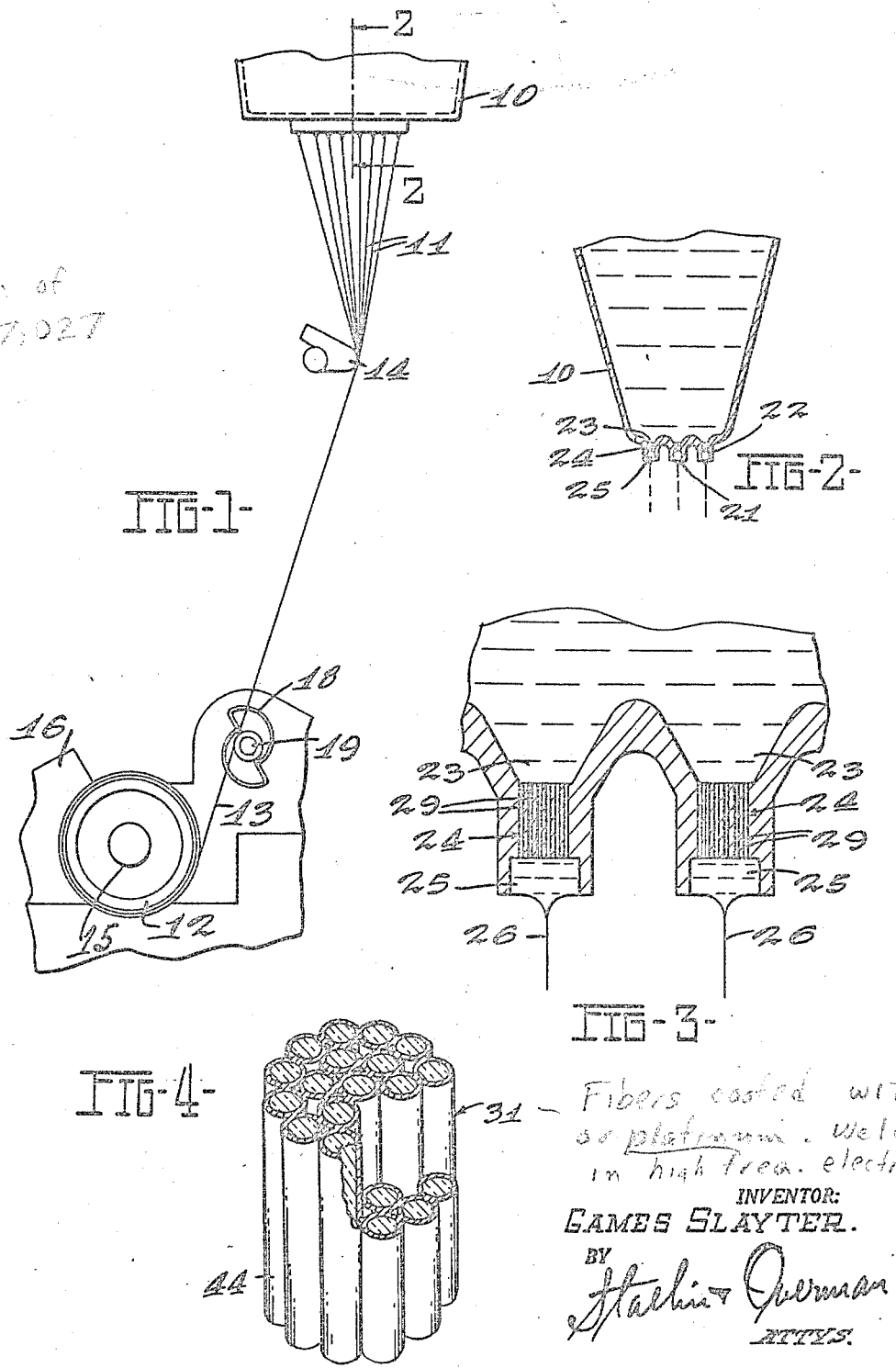
Fibers coated with gold or platinum. Welded together in high freq. electrical field
INVENTOR:
GAMES SLAYTER.

United States Patent Office 2,961,758
Patented Nov. 29, 1960

2,961,758

METHOD OF MAKING A METAL ELEMENT

Games Slayter, Newark, Ohio, assignor to Owens-Corning Fiberglas Corporation, a corporation of Delaware Original application Jan. 16, 1952, Ser. No. 266,748. Divided and this application Aug. 9, 1957, Ser. No. 677,355

4 Claims. (Cl. 29—419)

This invention relates to a method of making apparatus for making glass fibers and particularly to a feeder for molten glass that will feed the glass in a plurality of streams. In particular the feeder of the present invention is adapted to flow molten glass as a stream which is drawn out into a fiber and the feeder subdivides the stream into a multiplicity of minute streamlets each of exceedingly small diameter and by this operation the glass is hydraulically worked to be conditioned to provide the desired improved properties in the fiber. This working of the glass into minute streams causes all portions of the glass to be strung out into fine stria so that any aggregates of molecules are oriented so as to all extend in substantially the same direction and thus impart added strength to the fibers.

These aggregates of molecules apparently are the result of incipient crystallization, that is, the molecules have started to become oriented and collected in the position they would have if the glass were crystallized but this action has not proceeded to the crystalline state. Evidences of this precrystalline state or incipient crystallization have been observed in electron micrographs of very fine glass fibers. When fibers in the order of a few hundred thousandths of an inch in diameter are magnified twenty thousand times, it is observed that those fibers that are visible as translucent bodies show within the body a nodular arrangement with the nodules showing up as grayish blobs with fuzzy and indistinct borders, but nevertheless as dense zones of greater opacity than the areas between the zones.

Such dense zones apparently are molecular aggregates that are in the process of coming into the regular orientation that is characteristic of crystals. It may be that these nodules are not yet grown to crystalline dimensions but rather constitute crystal nuclei. These aggregates are herein referred to as incipient crystals and the effect is referred to as incipient crystallization.

When glass that is in this state of incipient crystallization is strung out into exceedingly fine streamlets, that is, streams having diameters in the order of a thousandth or less of an inch in diameter, these aggregates of molecules or incipient crystals may be strung out into oriented arrangements which contribute to increased strength and possibly also greater resistance to fracture of the glass. In the present invention this stringing out of the glass is accomplished by passing the glass as it flows to the fiber forming zone through minute passages or tubules which subdivide the glass into a multiplicity of fine streamlets which are then recombined into a larger stream which is immediately attenuated into a fiber.

The glass is rapidly cooling throughout this operation of subdivision, recombining and attenuation, so that any orientation imparted to the molecular structure of the glass is quickly frozen into the glass as the glass solidifies.

This application is a division of my copending application Serial Number 266,748, filed January 16, 1952, now Patent Number 2,947,027.

It is an object of the present invention to provide such a device that may be provided with exceedingly small passages therethrough so as to divide the glass into a number of exceptionally small streamlets.

In the drawings:

Figure 1 is an elevational view of one form of fiber forming operation to which the present invention applies;

Figure 2 is an enlarged cross sectional view taken on line 2—2 in Figure 1 of the feeder for feeding the streams of molten glass that are to be attenuated;

Figure 3 is a similar view but on a much larger scale showing two of the feeding orifices in the feeder; and Figure 4 is a perspective view of a part of the feeding device of the invention.

The present invention has utility wherever glass is converted into fabricated articles but it has particular utility in the manufacture of fibers from glass. And it can be applied to any of those processes where glass in a molten state is flowed into small streams and these streams are then attenuated into fibers by the application thereto of suitable forces, for instance, by mechanically pulling the streams and attenuating them into fibers or by the application to the streams of a blast of gas or steam moving at high velocity in a manner to draw out the streams into fibers.

One such process of manufacturing glass fibers is shown schematically in Figure 1 where 10 represents the feeder from which the streams of molten glass flow, 11 represents the streams as they are drawn into fibers and 12 is a rotating spool onto which the fibers are wound in the form of a strand 13, which strand results from the collection of the fibers 11 into a bundle by means of a collecting device or guide 14.

The spool is mounted on a spindle 15 journaled in suitable bearings in a frame 16 which also supports a traversing device 18 comprising a rotating shaft 19 having thereon a series of strand engaging cams which move the strand laterally along the spindle 12 so as to be wound thereon in crisscrossed relation.

The feeder 10 is provided in its bottom wall with a plurality of feeding orifices 21 each of which extends through a nipple 22 protruding from the bottom wall of the feeder. A plurality of these nipples are arranged on the bottom wall usually with the nipples in rows and with several rows of such nipples running lengthwise of the feeder.

As shown in Figure 3 the orifice 21 through each nipple 22 has three portions, the first and upper one being the infeeding passageway 23 through which the molten glass flows on its way into the nipple, and by virtue of which the glass is divided into the streams that are attenuated into fibers. An intermediate passageway 24 adjoins the infeeding portion and in this passageway the stream of molten glass that is to be attenuated is divided into a multiplicity of minute streamlets. This passageway 24 is immediately followed by a tip section 25 in which the streamlets are recombined into a single stream which is then immediately attenuated as represented by the lines 26 into a fiber. This tip section is as small as practicable so so that a minimum of glass is retained therein, with the result that after recombination of the streamlets, the resulting glass stream is attenuated into a fiber before the condition imparted to the glass by the subdivision into streamlets can be altered. Toward this end it may be desirable in some cases to reduce the diameter of the tip passageway 25.

In the form of the invention shown in Figure 3 the small passages or tubules in the passageway 24 of the orifice through the nipple are in the form of very fine holes 29. These tubules should be exceedingly fine openings preferably no larger than approximately three ten-thousandths of an inch. As the glass flows through these tubules it is strung out into exceedingly small streams which effect an hydraulic working of the molten glass to properly condition it for obtaining the best properties in the finished fiber.

To obtain very fine passages through the nipple in a practical manner the construction shown in Figure 4 is desirable. Here the passageway that is made up of the fine passages is in a plug 31 that is inserted into a bore 29 in the nipple. This Figure 4 shows a multiplicity of glass fibers gathered together into a compact bundle. The fibers are each coated with a metallic coating, such as a coating of gold or platinum or the like, applied by any suitable process as, for instance, by electrodeposition. After the coated fibers are gathered together into a compact bundle they are held together under high pressure and simultaneously subjected to a heating operation, for instance, by being placed in a high frequency electrical field. The heating operation, combined with the pressure exerted on the bundle, welds the coated fibers together at their points of contact. After the welding operation the bundle of welded, coated fibers 44 is cut to the desired length and inserted in the bore 29 in the feeder shown in Figure 4. Subsequently when the feeder is placed in operation and heated to the temperature required to melt glass the glass fibers in the plug 31 are fused and the resulting molten glass flows from the plug leaving a plurality of exceedingly fine tubules through which the molten glass passes through the feeder.

Various modifications may be made in the present invention within the spirit and scope of the appended claims.

I claim:

1. The process of producing an element containing a plurality of fine tubules comprising coating the individual surfaces of a plurality of glass fibers with metal, assembling a plurality of the fibers coated with metal to form a bundle with the coated fibers all extending in substantially the same direction and substantially all in lateral contact, converting said bundle into a unitary structure by joining the metal coatings on said fibers to each other, and thereafter heating the unitary structure to soften the glass fibers and flowing the softened glass from the coatings to leave a plurality of tubes associated together in side by side parallel relation.

2. The process of making an element for a feeder for molten glass having fine pores or passages therethrough comprising welding together a plurality of glass fibers coated with metal to form a bundle with the coated fibers substantially all in substantial parallelism and lateral contact, inserting said bundle as a plug in an opening through a wall of said feeder with the fibers all substantially parallel to the axis of said opening, and thereafter melting out the glass fibers from the coatings to leave a plurality of tubes associated together in side by side relation to subdivide said opening in said wall into smaller openings extending in substantial parallelism through their lengths.

3. The process of making a feeder for molten glass including an element providing small pores or passageways, comprising coating glass fibers with metal, assembling a plurality of coated fibers into a bundle with the fibers in side by side relation and substantially all in parallelism and the coatings in contact, joining the contacting metal coatings to each other, inserting said bundle as a plug in an opening through a wall of said feeder with the fibers all substantially parallel to the axis of said opening, and thereafter melting out the glass fibers from the coatings to leave a plurality of tubes associated together in side by side relation to subdivide said opening in said wall into smaller openings extending in substantial parallelism through their lengths.

4. The process of making a feeder for molten glass including an element for feeding molten glass in fine streams comprising coating glass fibers with a metal selected from the group consisting of gold and platinum, assembling a plurality of coated fibers into a bundle with the coatings on the fibers substantially all in contact and the fibers in side by side substantially parallel relation, severing said bundle transversely into shorter lengths, inserting such lengths into openings through a wall of said feeder with the fibers all substantially parallel to the axis of said opening, and thereafter melting out the glass fibers from the coatings to leave a plurality of tubes associated together in side by side relation to subdivide said openings in said wall each into smaller openings extending in substantial parallelism through their lengths.

References Cited in the file of this patent

UNITED STATES PATENTS

| | | |
|---|---|---|
| 1,041,176 | Schitzkowsky | Oct. 15, 1912 |
| 1,821,659 | McEvoy | Sept. 1, 1931 |
| 2,297,817 | Truxell | Oct. 6, 1942 |
| 2,373,405 | Lowit | Apr. 10, 1945 |
| 2,616,165 | Brennan | Nov. 4, 1952 |
| 2,619,438 | Varian et al. | Nov. 25, 1952 |
| 2,628,417 | Peyches | Feb. 17, 1953 |
| 2,641,439 | Williams | June 9, 1953 |
| 2,771,667 | Sunden | Nov. 27, 1956 |

FOREIGN PATENTS

| | | |
|---|---|---|
| 507,711 | France | July 2, 1920 |